(No Model.) 3 Sheets—Sheet 1.

J. H. SHEARN.
KNOT TYING MACHINE.

No. 245,667. Patented Aug. 16, 1881.

Witnesses.
Chas. L. Burdett.
James J. Greene

Inventor.
Joseph H. Shearn
By W. E. Simonds
Atty (No Model.)  3 Sheets—Sheet 2.

J. H. SHEARN.
KNOT TYING MACHINE.

No. 245,667.  Patented Aug. 16, 1881.

Witnesses.
Chas. L. Burdett.
James J. Greene.

Inventor.
Joseph H. Shearn
By W. E. Simonds
Atty (No Model.) 3 Sheets—Sheet 3.

J. H. SHEARN.
KNOT TYING MACHINE.

No. 245,667. Patented Aug. 16, 1881.

Witnesses.
Chas. L. Burdett.
James J. Greene.

Inventor.
Joseph H. Shearn
By W. E. Simonds
Atty

UNITED STATES PATENT OFFICE.

JOSEPH H. SHEARN, OF LEEDS, MASSACHUSETTS.

KNOT-TYING MACHINE.

SPECIFICATION forming part of Letters Patent No. 245,667, dated August 16, 1881.

Application filed April 21, 1881. (No model.)

*To all whom it may concern:*

Be it known that I, JOSEPH H. SHEARN, of Leeds, in the county of Hampshire and State of Massachusetts, have invented a certain new and useful Improvement in Knot-Tying Machines, of which the following is a description, reference being had to the accompanying drawings, where—

Figure 2:
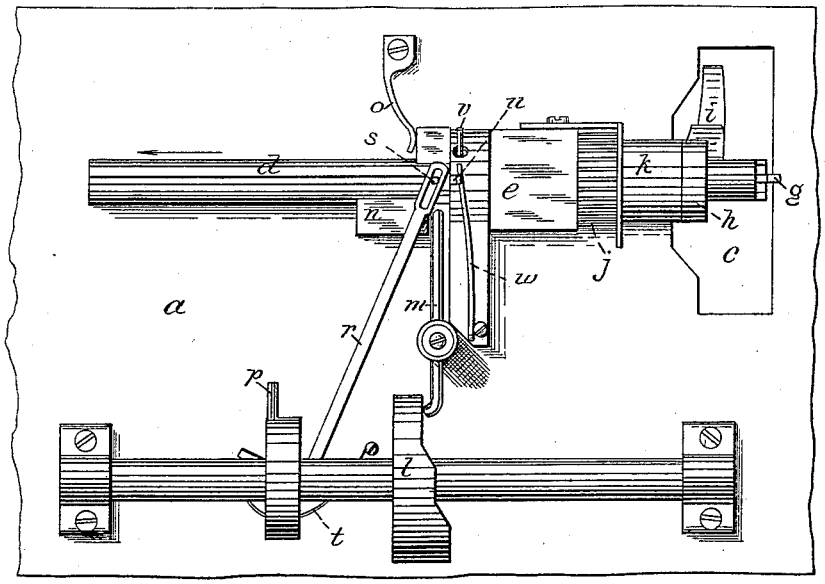
Figure 1:
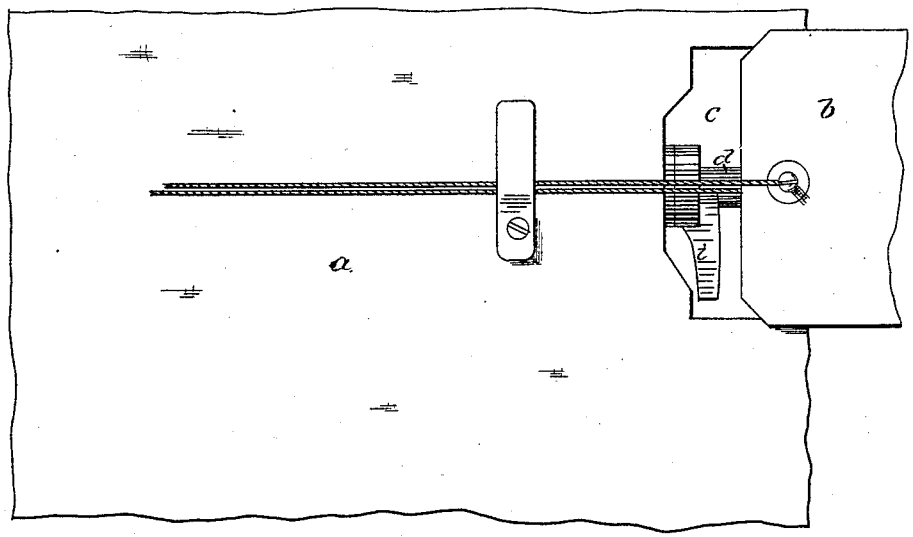
Figure 3:
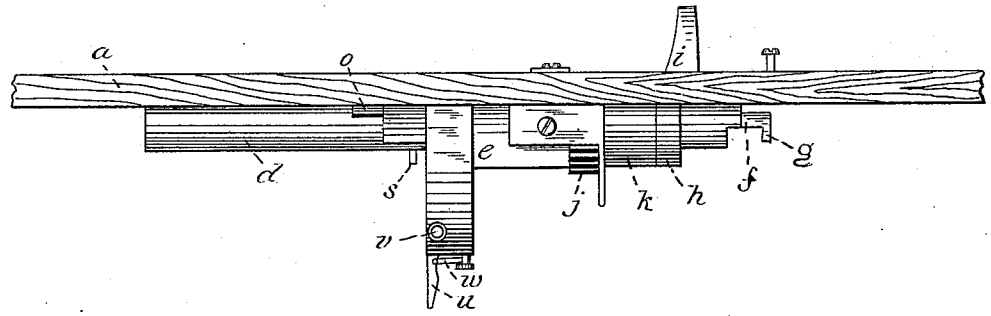
Figure 4:
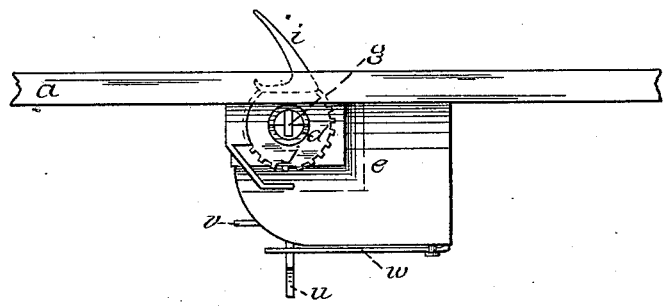
Figure 5:
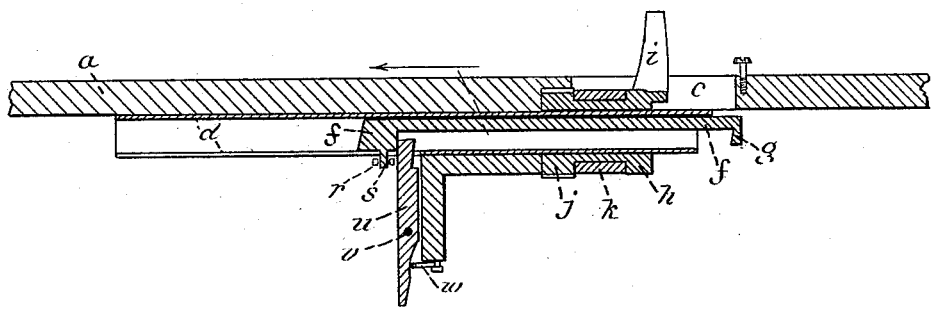
Figure 6:
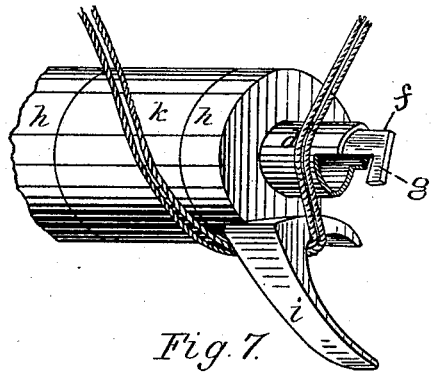
Figure 7:
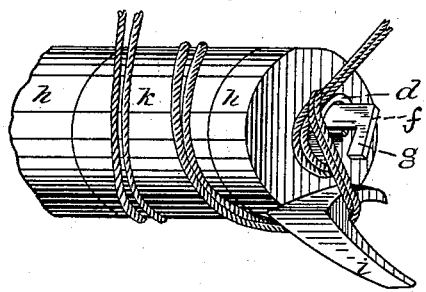
Figure 8:
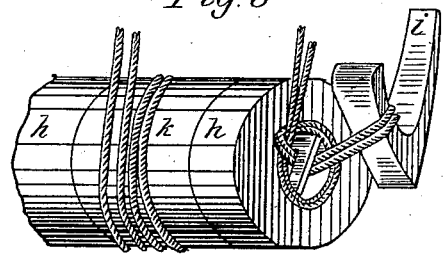
Figure 9:
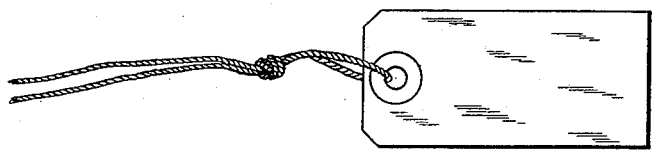

Figure 1 is a top view of a portion of a table-top with my said improvement attached, and with a tag laid thereon, provided with a doubled cord ready to have a knot tied therein. Fig. 2 is a bottom view of same. Fig. 3 is a side view or elevation of same from the side opposite to the cam-shaft, with the cam-shaft and its immediate appurtenances and also the tag omitted. Fig. 4 is an end view of same, tag omitted, from end nearest the rotating hook *i*, as seen in Figs. 1 and 2. Fig. 5 is a view of same, tag omitted, in vertical longitudinal section on a plane passing through the axis of the non-rotary shaft and non-rotary sleeve. Fig. 6 is a view showing a stage of the knot-tying, more particularly referred to hereinafter. Fig. 7 is a view showing a stage of the knot-tying subsequent to that shown in Fig. 6. Fig. 8 is a view showing a stage of the knot-tying subsequent to that shown in Fig. 7. Fig. 9 is a view of the product of the apparatus—that is, a tag having a doubled cord in the eye thereof, with a single knot in both cords near the tag.

The improvement described herein is an improvement on, or modification of, the knot-tying apparatus described in Letters Patent for machine for making looped tags, issued to me January 11, A. D. 1881, and numbered 236,461. As treated herein, the tag with the doubled cord of proper length through its eye, is supposed to be presented to the tying apparatus by hand; but, as a matter of fact, the device herein described is intended mainly for use in connection with presenting and cutting-off devices, substantially such as are shown in my said patent, so that the tag with the cord in it is presented to the tying device by automatic machinery, and after the knot is tied the cord in the tag is severed from the stock-cord by automatic machinery.

The letter *a* denotes the table to which the tying apparatus is fixed. *b* denotes a tag lying thereon with a doubled cord through its eye, trailed across the mortise *c* in the table, in the proper position for the tying operation.

The letter *d* denotes a non-rotary sleeve having appropriate longitudinal movement in the bearing-block *e*; and the letter *f* denotes a non-rotary shaft having its own appropriate longitudinal movement in the sleeve *d*. On the end of this shaft *f* is a hook, *g*.

The letter *h* denotes a sleeve rotarily hung on the outside of sleeve *d*, and bearing fixed thereto the rotating-hook *i*. Its rotation is given through the medium of the gear *j*, which meshes into an appropriate driving-gear. The sleeve *h* bears exteriorly the friction-sleeve or pulley *k*, which rotates freely on sleeve *h*, facilitating the escaping movement of the doubled cord when it, at the appropriate stage of the operation, is wound upon this sleeve and drawn therefrom as the operation progresses.

The sleeve *d* has a longitudinal movement in two steps at appropriate times in the direction denoted by the overlying arrow, given by the rotary French cam *l*, acting through the intermediate lever, *m*, which co-operates with lug *n* fast to sleeve *d*. The retractile or opposite movement of sleeve *d* is insured by spring *o*. The shaft *f*, bearing hook *g*, has a very considerable longitudinal movement within sleeve *d* at the appropriate time in the direction denoted by the arrow last referred to, which is given by the rotating pin *p*, acting through the medium of the lever *r*, slotted at the end, and taking the pin *s*, appurtenant to shaft *f*, into the slot. When pin *p*, in rotating, slips off lever *r* the spring *t* gives shaft *f* its retractile movement.

The letter *u* denotes a knot-tightener, pivoted on pin *v*, pressed upon by spring *w*, and projecting into a slot made longitudinally in the shaft *f*.

The position of the parts with the tag and twine in place ready for the knot to be tied is shown in Fig. 1. The rotary hook *i*, in rotating, catches the two strands of cord and distributes one (double) line on and around the surface of the frictional sleeve *k*, and the other (double) line on and around the sleeve *d*, as seen in Fig. 6. Just as one complete circle of twine is laid on sleeve *d* that sleeve moves a step longitudinally inward, so that the hook *i*, in continuing to rotate, lays the next strand between the end of sleeve *d* and the hook *g*, as shown in Fig. 7. The shaft $f$ has now commenced its inward longitudinal movement, causing the hook $g$ to catch the strand last laid and carry it within the sleeve $d$. As hook $g$ continues its inward movement it pulls the strand which has been laid around friction-sleeve $k$ off that sleeve—its advantages as a friction-pulley now appearing—and carries it into sleeve $d$, which now makes its second short longitudinal step inward, throwing the now loosely-formed knot off this sleeve—a position of affairs represented in Fig. 8. Near the inner limit of its longitudinal movement the hook $g$ carries the cord it pulled into sleeve $d$ against the knot-tightener $u$, so that the cord is grasped or held between the two. Then the hook $g$ moves a little farther inward, which the spring and pivot of the knot-tightener permit, pulling on the cord and thus drawing the loosely-formed knot taut. The operation is now complete, and the tag with the knot tied in its cord ready to be removed.

I claim as my present invention—

1. The combination of the longitudinally-reciprocating hook-bearing shaft $f$, the longitudinally-reciprocating sleeve $d$, and the rotating hook $i$, all substantially as described, and for the purpose set forth.

2. The combination of the rotating hook $i$, the longitudinally-reciprocating sleeve $d$, the longitudinally-reciprocating hook-bearing shaft $f$, and the knot-tightener $u$, all substantially as described, and for the purpose set forth.

3. The combination of the rotating hook $i$, the friction-sleeve $k$, the longitudinally-reciprocating sleeve $d$, and the longitudinally-reciprocating hook-bearing shaft $f$, all substantially as described, and for the purpose set forth.

JOSEPH H. SHEARN.

Witnesses:
 E. C. DAVIS,
 W. S. HOWARD.